US008001106B2

(12) United States Patent　　(10) Patent No.: US 8,001,106 B2
Agarwal et al.　　(45) Date of Patent: Aug. 16, 2011

(54) SYSTEMS AND METHODS FOR TOKENIZING AND INTERPRETING UNIFORM RESOURCE LOCATORS

(75) Inventors: Amit Jagdish Agarwal, Bangalore (IN); Krishna Leela Poola, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 488 days.

(21) Appl. No.: 12/163,898

(22) Filed: Jun. 27, 2008

(65) Prior Publication Data

US 2009/0327304 A1　　Dec. 31, 2009

(51) Int. Cl.
*G06F 7/20*　　(2006.01)
*G06F 17/10*　　(2006.01)

(52) U.S. Cl. .................................. 707/709; 707/755

(58) Field of Classification Search ............... 7/10, 100, 7/999.01, 999.1, 708, 709, 755; 707/10, 707/100, 102, 104.1, 999.01, 999.1, 999.102, 707/999.107, 708, 709, 755

See application file for complete search history.

(56) References Cited

U.S. PATENT DOCUMENTS

| 7,680,785 | B2 * | 3/2010 | Najork ........................ 707/999.5 |
| 2004/0054750 | A1 * | 3/2004 | de Jong et al. ................ 709/217 |
| 2008/0010291 | A1 | 1/2008 | Poola et al. |
| 2008/0010292 | A1 | 1/2008 | Poola |
| 2009/0164485 | A1 * | 6/2009 | Burke et al. .................... 707/100 |

OTHER PUBLICATIONS

Z. Bar-Yossef, I. Keidar and U. Schonfeld, "Do not Crawl in the DUST: Different URLs with Similar Text Extended Abstract," Proceedings of the 15th international conference on World Wide Web, May 22-26, 2006, Edinburgh, Scotland , pp. 1015-1016.

S.H. Lee, S.J. Kim and S.H. Hong, "On URL Normalization," O. Gervasi et al. (Eds.): ICCSA 2005, LNCS 3481, pp. 1076-1085, 2005, Springer-Verlag Berlin Heidelberg 2005. (Available at http://dblab.soongsil.ac.kr/publication/LeKi05a.pdf, last visited on Jun. 19, 2008.).

P.-J. Yeh, J.-T. Li and S.-M. Yuan, "Tracking the Changes of Dynamic Web Pages in the Existence of URL Rewriting," Proceedings of the fifth Australasian conference on Data Mining and Analystics, vol. 61, Sydney, Australia, pp. 169-176, 2006.

* cited by examiner

*Primary Examiner* — James Trujillo
*Assistant Examiner* — Bruce M Moser
(74) *Attorney, Agent, or Firm* — Hickman Palermo Truong & Becker LLP

(57) ABSTRACT

Aspects include methods, computer readable storing instructions for such methods, and systems for processing text strings such as URLs that comprise patterns of parameters and values for such parameters, delimited in a site-specific manner. Such aspects provide for accepting a number of text strings that are expected to have a common delimiting strategy, then deeply tokenizing those text strings to arrive at a set of tokens from which are selected anchor tokens used to form patterns having the anchor tokens separated by wildcard portions for recursive processing. The patterns formed can be mapped to a tree of nodes. Information concerning relationships between nodes and between tokens within a given node, as well as other heuristics concerning which tokens are parameters and which are values can be used as observed events for producing probabilities that certain tokens are parameters or values, using a dynamic programming algorithm, such as a Viterbi algorithm.

30 Claims, 5 Drawing Sheets

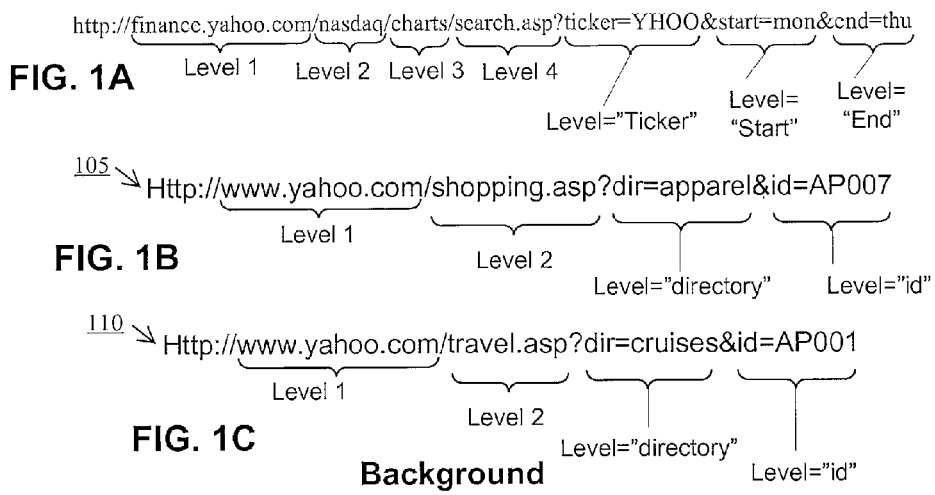
FIG. 1A
FIG. 1B
FIG. 1C Background
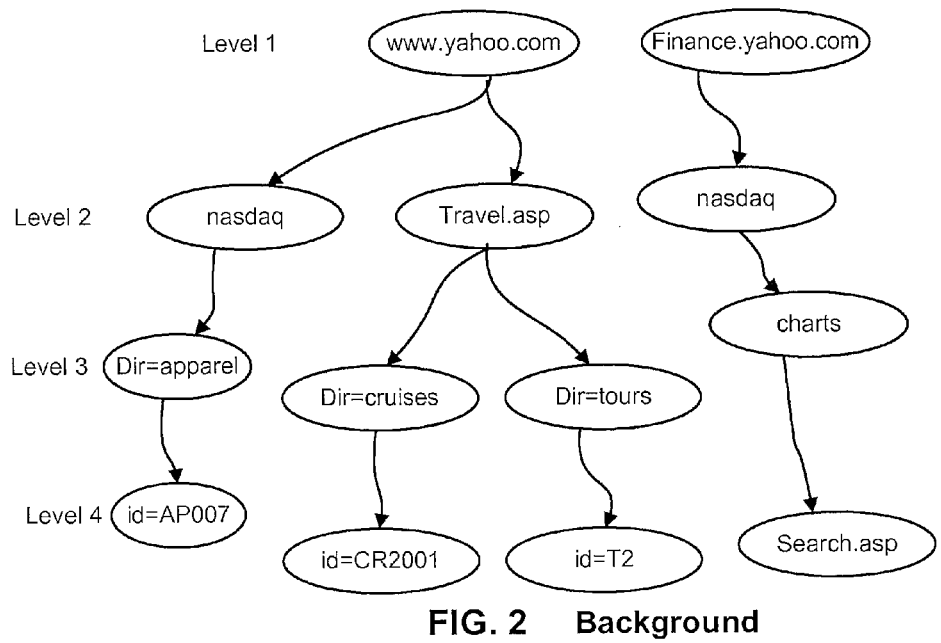
FIG. 2 Background

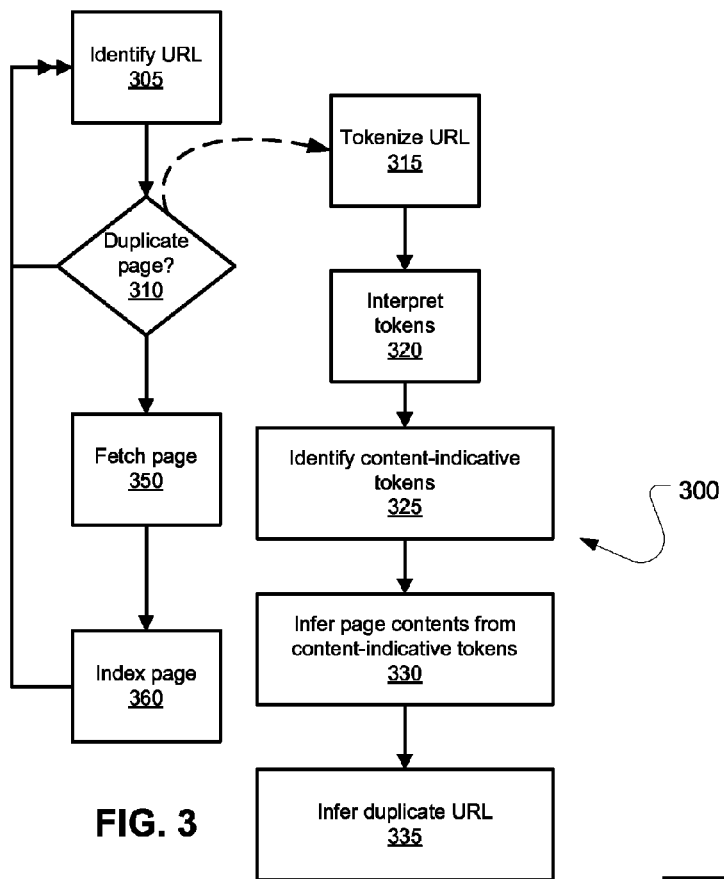
FIG. 3
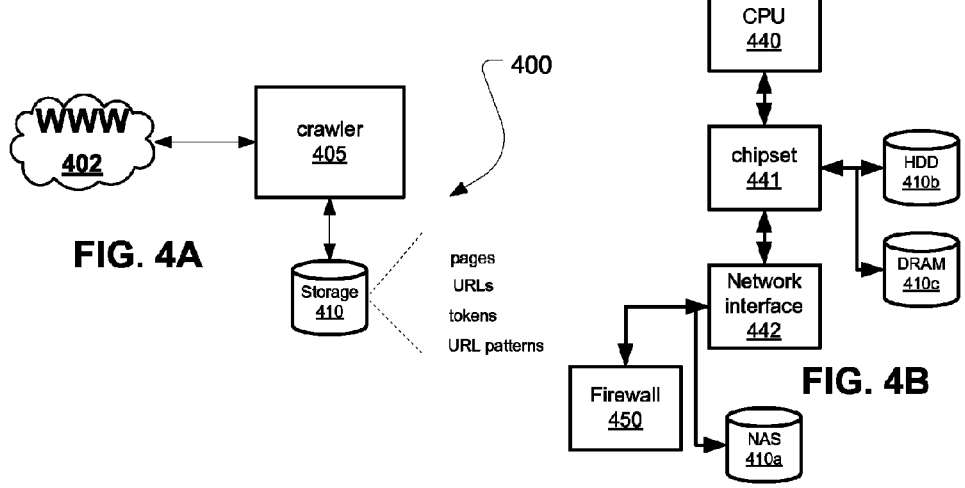
FIG. 4A
FIG. 4B

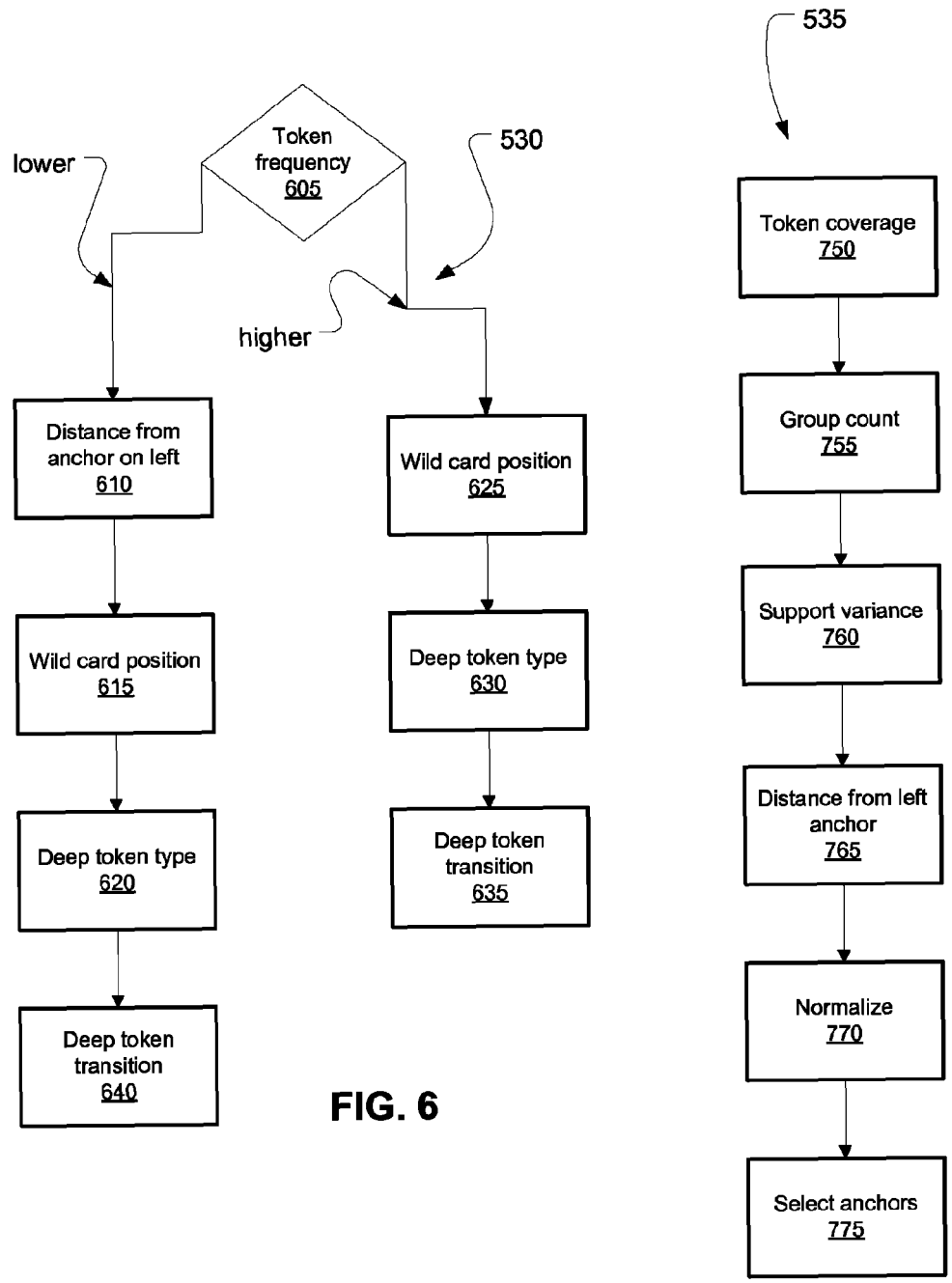

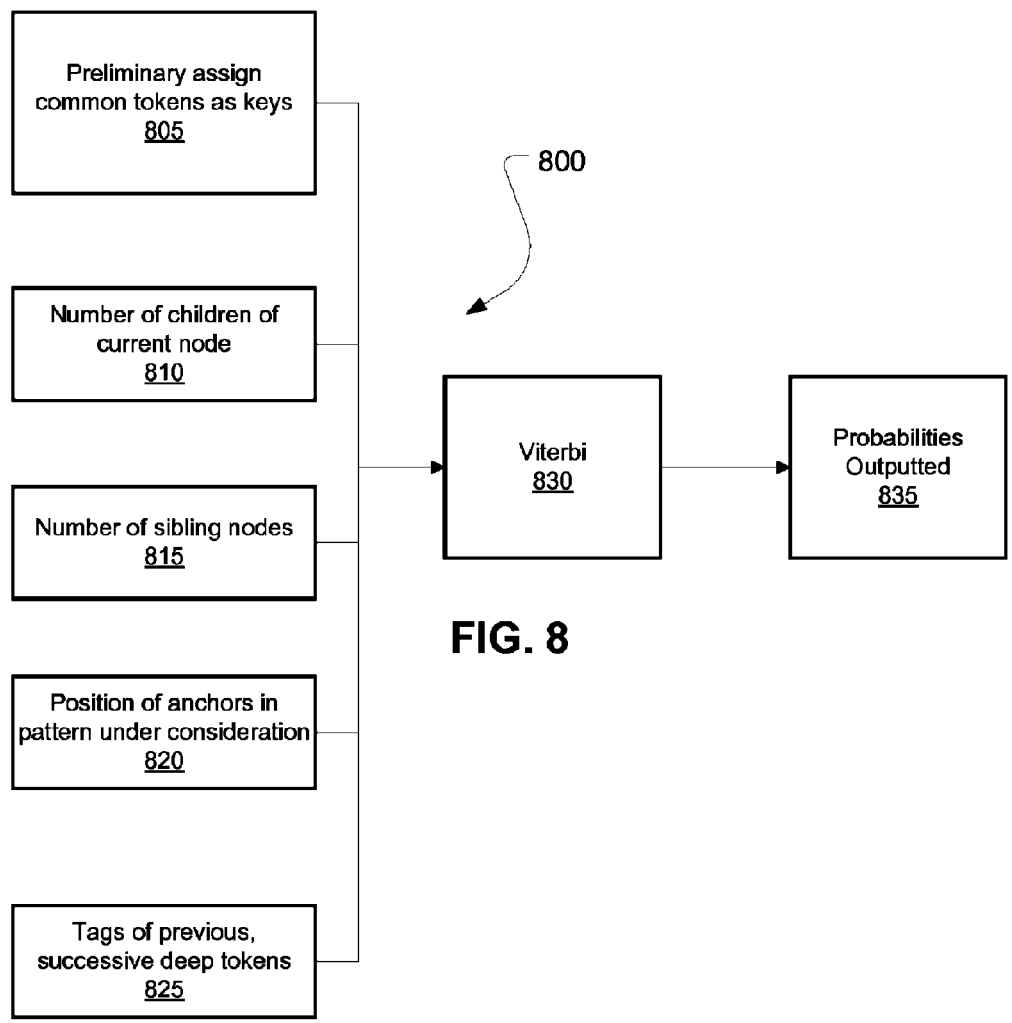

SYSTEMS AND METHODS FOR TOKENIZING AND INTERPRETING UNIFORM RESOURCE LOCATORS

BACKGROUND

1. Field

The present invention generally relates to usage of Uniform Resource Locators (URLs) and more particularly to machine interpretation, categorization, and usage of URLs for a variety of purposes.

2. Description of Related Art

The Internet is a worldwide system of computer networks and is a public, self-sustaining facility that is accessible to tens of millions of people worldwide. The most widely used part of the Internet is the World Wide Web (WWW). The web is an Internet service that organizes information through the use of hypermedia. The HyperText Markup Language ("HTML") can be used to specify the contents and format of a hypermedia document (e.g., a web page).

In this context, an HTML file is a file that contains the source code interpretable by a web browser for rendering a particular web page. Unless specifically stated, an electronic or web document may refer to either the source code for a particular web page or the web page itself. Each page can contain embedded references to images, audio, video, scripts, Flash objects, and other kinds of objects, or other web documents.

Search engines index a large number of web pages and provide an interface that can be used to search the indexed information by entering certain words or phrases to be queried. These search terms are often referred to as "keywords". Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate web documents around the world.

Upon locating a document, the crawler can store the document's URL, and follows any hyperlinks associated with the document to locate other web documents. Second, each search engine contains information extraction and indexing mechanisms that extract and index certain information about the documents that were located by the crawler. In general, index information is generated based on the contents of the HTML file associated with the document. The indexing mechanism stores the index information in large databases that can typically hold an enormous amount of information. Third, each search engine provides a search tool that allows users, through a user interface, to search the databases in order to locate specific documents, and their location on the web (e.g., by storing a Uniform Resource Locator, or URL), that contain information that is of interest to them.

URLs contain significant amount of information which could be used by applications like Web search, crawling, and sponsored search for improving indexing throughput, and relevance of search results and ad placement. URLs for web pages may be dynamic or static. A dynamic URL can be a page address resulting from the search of a database-driven web site or the URL of a web site that runs a script. This contrasts with static URLs, in which the contents of the web page remain the same unless changes are hard-coded into the HTML.

Web sites can use dynamic URLs for content display, where parameters and values for the parameters are needed. The content of a web page may or may not vary based on certain of these values and presence of certain parameters that are used in searching databases for information responsive to the parameters. URLs that encode such parameters, which can be generated for example, from terms of a search query, are known as URLs for dynamic web pages. Some parameters may have little or no effect on the content of the web page displayed, but instead may reflect, for example, contents of a query used to arrive at that page.

Dynamic URLs can comply with a standard form, as specified presently in RFC 1738, and a URL can be considered standardized if it conforms to the URL specification in force at a given time, for example as in force presently in RFC 1738. An example URL according to RFC specifications is shown in FIG. 1A. FIG. 1A illustrates that levels of a URL includes levels including a level for identification of host and domain (finance.yahoo.com), then one or more levels of static information (e.g., nasdaq), then one or more levels comprising scripts (search.asp) and arguments for the scripts (e.g., ticker=YHOO).

If all URLs were presented in standard form, then determining whether or not a set of two or more URLs actually refer to the same page, are likely to have duplicative information, extracting information from them, or inferring what those pages may be about from the URL would be reasonably straight forward.

However, significant amount of web represent URLs in a non-standard form, making it difficult to extract, using machines, relevant information from the URLs, or determined what components of the URL may mean. Sometimes, non-standard form URLs still may be reasonably easy to parse, in that the non-standardization is limited. FIGS. 1B-1C illustrate URLs 105 and 110 that both can be parsed into 4 levels of information, like the URL of FIG. 1A, except that levels 3 and 4 of both URL 105 and 110 can be further parsed into sublevels according to one or more non-standard delimiters. The "=" sign is used as a delimiter between the key "dir" and the values "apparel" and "cruises" respectively in URL 105 and in URL 110. Likewise, the change between letters to numbers in level 4 of both URL 105 and URL 110 can be considered a non-standard delimiter allowing further subdivision of those levels of the URL.

In many cases, however, it is not so easy to identify appropriate non-standard delimiters that will allow in an appropriate subdivision into sub-levels of more complicated URLs. It would be desirable to have an effective machine-based way to more fully extract information present in non-standard URLs for any of a variety of purposes, including those described above.

SUMMARY

In some aspects, a plurality of related URL portions are obtained; these URL portions are suspected or likely to contain a plurality of parameters (keys) and values for the parameters, but are delimited in a non-standard way. The URL portions are tokenized to obtain an overinclusive set of deep tokens based on possible delimiters in use, e.g., case changes and characters other than alphanumeric characters and standard delimiters. These deep tokens are formed into patterns, and the patterns are arranged into a tree. Then, based on information such as information from the patterns and the arrangement in a tree, as well as heuristic assignments of deep tokens as keys and values, a Viterbi algorithm can be used to arrive at probabilities that each deep token is a key or a value, and then if desired the URL portions can be rewritten in a standardized format for further processing, display, production, or the like.

One more particular aspect includes a method for normalizing Uniform Resource Locators (URLs) having non-standard delimiters, which comprises (a) obtaining a plurality of related URLs, and (b) parsing the URLs with standardized delimiters to obtain a current token from each URL to be further normalized, each current token being a member of a set of current tokens. The method also comprises (c) identifying a set of deep tokens, each appearing in at least one of the current tokens; (d) determining anchors from the set of deep tokens. The method further comprises (e) forming patterns for the current tokens based on the anchors, the patterns comprising the anchors separated by wildcard subtokens comprising one or more deep tokens of the set, and (f) organizing each pattern formed in a tree of nodes, where each pattern formed is a sibling node to each other. The method also comprises (g) selecting a wildcard subtoken from a pattern to represent a new set of current tokens, and providing a child node of the node corresponding to that pattern. The steps (d)-(g) can be repeated with the new set of current tokens until it is determined that no more subtokenization is necessary. The method also can comprise tagging deep tokens as either keys or values based on organization information from the tree, and initial tag assignments.

The tagging can comprising a dynamic programming algorithm to receive the tree organization information, and initial tag assignments as observed events and to output probabilities that deep tokens in the tree are either keys or values.

In such a method, deep tokens can be grouped and/or selected as anchors using heuristic rules, such as type of deep token, frequency of deep token appearance, and respective positions of deep tokens within a current token.

Applications include using deep tokens classified as keys or values to aid in placement and selection of advertisements on web pages, determining whether to retrieve a web page during web crawling, which can be used for building search databases, sponsored search results, and other applications that can benefit from inferences concerning content of a web page.

BRIEF DESCRIPTION OF THE DRAWINGS

For a fuller understanding of aspects and examples disclosed herein, reference is made to the accompanying drawings in the following description.

FIGS. 1A-1C illustrate background aspects of dividing URLs into levels;

FIG. 2 illustrates background aspects of dividing URLs with standard delimiters into a tree of related nodes;

FIG. 3 illustrates steps of a method useful in the system of FIGS. 4A and 4B

FIGS. 4A and 4B illustrate aspects of an exemplary system that can be used for crawling the World Wide Web for indexing pages;

FIGS. 6-7 illustrates other aspects of portions of methods that may be useful in implementing methods according to aspects of FIG. 5; and FIG. 8 illustrates aspects of using a dynamic programming algorithm to refine or otherwise revise interpretation of identified sub-portions of URLs.

DETAILED DESCRIPTION

Figure 5:
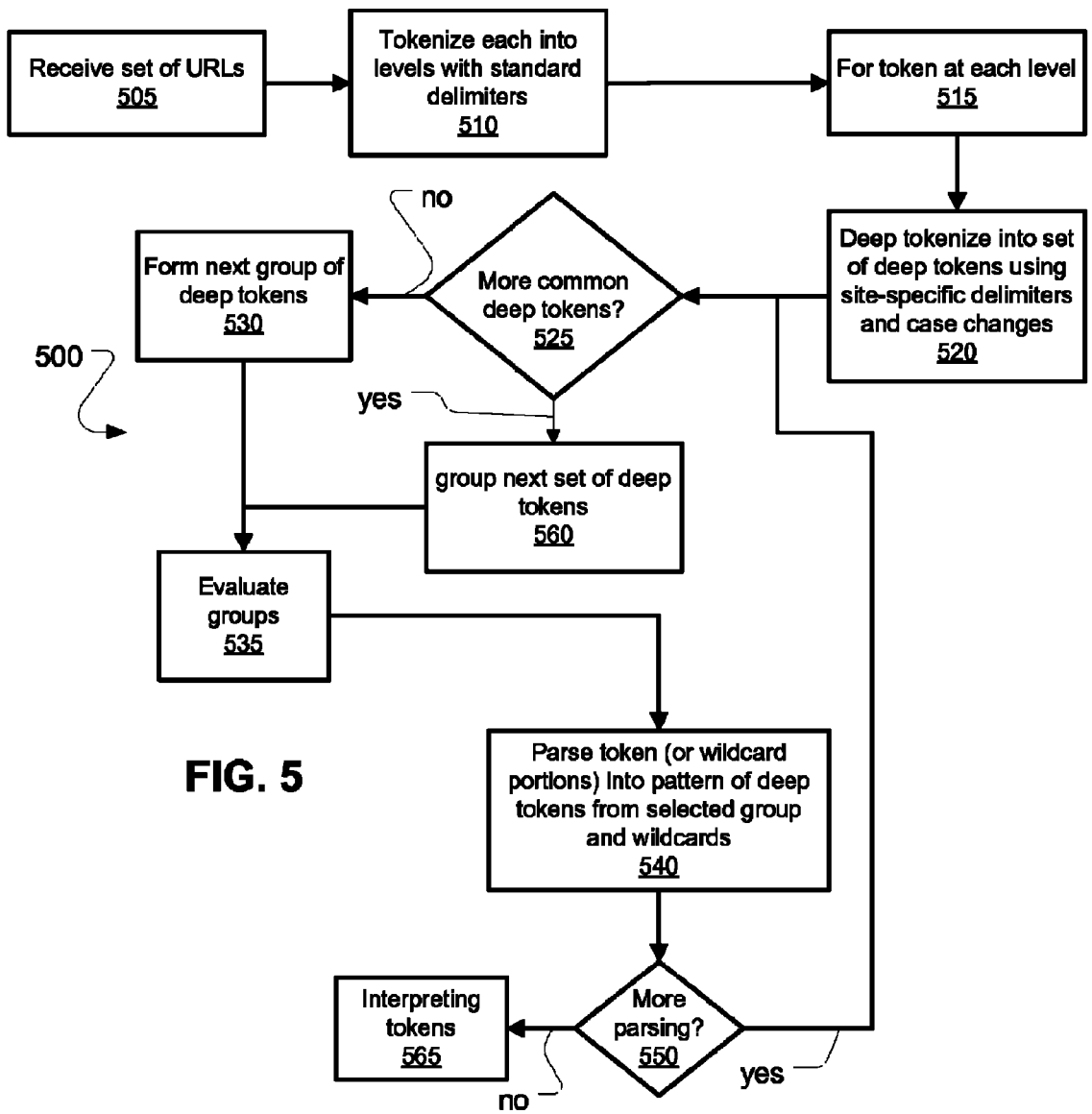
FIG. 5 illustrates steps of an exemplary method that can be performed in processing portions of URLs that may contain information delimited in non-standard formats.

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications.

In some aspects described, non-standard URLs are interpreted according to machines implementing algorithms comprising at least some of the following aspects. Not all such aspects need be included in a given algorithm. Algorithms according to these aspects use a number of example URLs from which patterns concerning site-specific usages within those URLs can be discerned.

In the introduction, it was described that URLs can be divided into levels (see, e.g., FIGS. 1A-1C) based on standard delimiters. Many web sites implement custom delimiting mechanisms for further levels within a URL, such that if the URL had been encoded with standard delimiters, the URLs could have been parsed still further, such as distinguishing between keys and arguments for such keys that are used as inputs to a script.

Thus, while a level can be considered an amount of a URL that can be parsed into tokens using standard delimiters, a given level can contain many portions, or sublevels, that could be more properly mapped as a level if rewritten using standard delimiters. A goal of the following systems and methods is to determine a delimiting scheme or pattern used for addressing content (often, dynamic content addressed by URLs) through a given networked resource (e.g., a web page) within levels determined first by standard delimiters. Then, if desired, those addresses or URLs can be rewritten to express the contents of a given address in a standardized format.

According to some examples disclosed herein, a number of URLs are obtained from a web site (disclosures can be applied more generally to any electronic addressing scheme, but for clarity these examples are based on the familiar WWW construct).

An overview of the component steps described below are (1) parsing URLs first using standard delimiters to obtain various levels (i.e., tokens), (2) deep tokenizing the levels (3) developing patterns in the levels using important deep tokens, where those patterns may still have wildcard portions (at first, subtokens with respect to the tokens obtained from standard delimiters) comprising other tokens that may be further subdivided, (4) the wildcard portions may be further parsed as tokens in (2)-(3) above (i.e., iteratively narrowing an extent of each wildcard portion), and (5) tokens in the final patterns of tokens identified can be tagged, and (6) the URLs can be rewritten in a standard form using standard delimiters.

Stated differently, tokens identified using standard delimiters are further processed in a recursive procedure to bring out a latent structure of keys and values. The component parts of the overall method are described prior to describing further how they may be integrated.

A motivating example of a system 400 in which aspects described herein can be employed is illustrated in FIG. 4a. System 400 comprises a crawler 405 interfacing with the World Wide Web (WWW). Crawler 405 accesses web pages, and determines whether to continue accessing other web pages identified in that web page in order to catalogue contents of the web for purposes such as providing search capabilities. Crawler works with storage 410 that can comprise any of a variety of storage mediums, including disc drives, solid state memories, tape drives, and the like. Storage 410 can provide working memory for crawler 405 and can storage retrieved pages, or portions of them, URL information, tokens, and patterns formed from URLs, as described further below.

FIG. 4b illustrates that crawler 400 can comprise components including a CPU 440 communicating with a chipset 441, which in turn communicates with a network interface 442 for communicating through a firewall 450 to the WWW 402 and with Network Attached Storage 410a, which may be a component implementing storage 410. Chipset 441 also can communicate with Hard Disk Drive(s)(HDD) 410b and with DRAM 410c, all of which may be components implementing storage 410 and which also may storage other information. CPU 440 may execute computer readable instructions (code) provided from computer readable media such as HDD 410b and DRAM 410c.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Such code can be stored in computer readable media, such as solid-state drives, hard drives, CD-ROMs and other optical storage means, transiently in nonvolatile memories as well as embodied in communication signals.

Crawler 400 can operate according to method 300 of FIG. 3, which includes identifying a URL (305), then, it is desirable to determine (310) whether the identified URL references a duplicative page, this is performed according to aspects and examples presented herein. In particular, the identified URL is tokenized (315), and those tokens are interpreted (320). Many aspects described herein relate to tokenizing and interpreting such URL tokens. Then, some of the tokens interpreted can be considered indicators of content of a page referenced by the identified URL, such that page contents can be inferred (330) from these tokens, and from such page content inferences, the likelihood that a URL is duplicative can also be estimated or inferred (335). Thus, where the identified URL is determined duplicative, crawler 400 may skip retrieving an entire page referenced by that identified URL and proceed again to identify another URL (305). If the page is determined not duplicative then the page can be fetched (350) and indexed (360)

I. Initial Parsing of URL Set with Standard Delimiters

Several of the following sections are described with reference to FIG. 5. Initially, a set of received (step 505) URLs are each divided (510) according to standard delimiters. Then, at each level identified with such standard delimiters, further subdivision is done by according to aspects described. For example, FIG. 1A illustrates that a URL can be parsed into levels 1-7, where the URL uses mostly standard delimiters.

However, if the URL instead had portions with custom delimiters; for example, if a level contained the token "discount-amazon-cat-11046471-sku-B000636FJG-item-sony_drx710ul_dvd_r_double_layer_external_dvd_rw_drive_16x" then standard delimiters would not help in further subdividing that token, even though likely other levels could be found within this level, i.e., if standard delimiters had been used to separate the contents of this token, then this token could have been divided into further levels.

It often would be the case that the set of custom delimiters within a given website would be unknown to third parties, and also it would be desirable to be able to avoid active human intervention in guessing or inferring the delimiters being used. The following describes an example of how custom delimited URL portions can be interpreted and potentially reformatted into a standard delimiter format, if desired.

To aid in providing more concrete examples for certain concepts described, Table 1, below, lists a numbered series of hypothetical portions (i.e., tokens or excerpts) from URLs, which are not delimited in a standardized format, and thus may benefit from processing according to disclosures herein. For these purposes, each item in table 1 can be called a token, and also can be said to have been extracted from a "level" of a URL, in the sense that these tokens could have been extracted from a URL based on standard delimiting.

TABLE 1

1. discount-amazon-cat-11046471-sku-B00006BB5V-item-8x_dvd_futurebay_evo_n180_.html
2. discount-amazon-cat-11046471-sku-B00006BB5X-item-dvd_cdrw_combo_futurebay_evo.html
3. discount-amazon-cat-11046471-sku-B000636FJG-item-sony_drx710ul_dvd_r_double_layer_external_dvd_rw_drive_16x.html
4. discount-amazon-cat-11046471-sku-B0007VU82W-item-original_dell_latitude_inspiron_8x_cd_rw_drive_dell_part_number_49mde_a01_.html
5. discount-amazon-cat-11046471-sku-B0007VU836-item-original_dell_latitude_inspiron_6x_dvd_24x_cdrom_drive_dell_part_number_8605u_.html
6. discount-amazon-cat-11046471-sku-B0007VU83G-item-original_dell_inspiron_latitude_dvd_r_dvd_rw_cd_r_cd_rw_combination_drive_.html
7. discount-amazon-cat-11046471-sku-B0007W097A-item-this_ibm_combo_drive_is_a_24x_cdr_10x_cdrw_and_8x_dvd_.html
8. discount-amazon-cat-11046471-sku-B0007W0984-item-original_dell_latitude_inspiron_laptop_8x4x24x8x_dvd_cd_rw_combo_drive_.html
9. discount-amazon-cat-11046471-sku-B0007W098O-item-dell_cd_rw_dvd_rom_combo_drive_24x10x24x_8x_ide.html
10. discount-amazon-cat-11046471-sku-B0007W1GB8-item-original_dell_latitude_inspiron_cd_rw_dvd_combo_drive_.html
11. discount-amazon-cat-11046471-sku-B0007W1GBI-item-original_dell_latitude_inspiron_24x_24x_24x_cd_rw_and_8x_dvd_rom_combo_drive_.html
12. discount-amazon-cat-11046471-sku-B0007W4JSK-item-original_dell_latitude_inspiron_cd_cdrw_dvd_combo_drive_dell_part_8f947_a00_.html
13. discount-amazon-cat-11046471-sku-B00080L82Q-item-original_dell_latitude_inspiron_8x_dvd_drive_.html
14. discount-amazon-cat-11046471-sku-B00080MAVE-item-compaq_4x_dvd_drive_for_use_with_laptops_.html
15. discount-amazon-cat-11046471-sku-B00080O5T4-item-original_dell_inspiron_7000_and_7500_floppy_drive_8x_dvd_combo_drive_.html
16. discount-amazon-cat-11046471-sku-B00080O5TE-item-original_dell_latitude_inspiron_8x_dvd_drive_.html
17. discount-amazon-cat-11046471-sku-B00080O5TO-item-original_dell_latitude_inspiron_8x_dvd_drive_.html
18. discount-amazon-cat-11046471-sku-B00080O5TY-item-original_dell_latitude_inspiron_sdvd6004_dvd_recorder_dvd_rw_and_cdrw.html
19. discount-amazon-cat-11046471-sku-B00080QA5Q-item-original_dell_latitude_inspiron_8x_dvd_drive_.html
20. discount-amazon-cat-11046471-sku-B00080QA6O-item-this_original_dell_latitude_inspiron_dvd_rw_r_drive.html
21. discount-amazon-cat-11046471-sort-pmrank+1.html
22. discount-amazon-cat-11046471-sort-pmrank+2.html
23. discount-amazon-cat-11046471-sort-pmrank.html
24. discount-amazon-cat-11046471-sort-salesrank+1.html
25. discount-amazon-cat-11046471-sort-salesrank+2.html
26. discount-amazon-cat-11046471-sort-salesrank.html TABLE 1-continued 27. discount-amazon-cat-11046471-sort-titlerank+1.html
28. discount-amazon-cat-11046471-sort-titlerank+2.html
29. discount-amazon-cat-11046471-sort-titlerank.html
30. discount-amazon-cat-11046471.html
31. discount-amazon-cat-1205230-sku-B000056Q1I-item-kensington__62641__flylight__notebook__light__usb.html
32. discount-amazon-cat-1205230-sku-B000065U9U-item-kensington__flylight__usb__notebook__light__with__red__led__model__62644.html
33. discount-amazon-cat-1205230-sku-B000065UTC-item-kensington__flyfan__usb__notebook__fan__model__62648.html
34. discount-amazon-cat-1205230-sku-B00006B7IU-item-usb__flexlight__powered__light__forall__laptops__with__usb__port.html
35. discount-amazon-cat-1205230-sku-B00006B8NH-item-kensington__flylight__portable__usb__light__in__platinum__color.html
36. discount-amazon-cat-1205230-sku-B00006B91X-item-targus__pa015u__notebook__usb__light.html
37. discount-amazon-cat-1205230-sku-B00006HMPU-item-iconcepts__71052__notebook__light__numeric__keypad.html
38. discount-amazon-cat-1205230-sku-B00007L5W7-item-ezonics__cobracam__notebook__webcam__and__light__usb.html
39. discount-amazon-cat-1205230-sku-B00008L3J1-item-belkin__retractable__usb__light__f8e448.html
40. discount-amazon-cat-1205230-sku-B00008NUZQ-item-night__light__for__notebooks.html
41. discount-amazon-cat-1205230-sku-B00008VF74-item-spot__notebook__light.html
42. discount-amazon-cat-1205230-sku-B00009APT7-item-targus__pa017u__usb__retractable__notebook__light__silver.html
43. discount-amazon-cat-1205230-sku-B0000VLYYA-item-ambient__stock__orb.html
44. discount-amazon-cat-1205230-sku-B00022VBAE-item-kensington__flylight__2__0__usb__notebook__light__model__33120.html
45. discount-amazon-cat-1205230-sku-B0002AKX6Y-item-notebook__usb__light.html
46. discount-amazon-cat-1205230-sku-B0009JB7IQ-item-thermaltake__usb__dual__led__light__blue.html
47. discount-amazon-cat-1205230-sku-B0009JCVBS-item-thermaltake__usb__dual__led__light__white.html
48. discount-amazon-cat-1205230-sort-pmrank+1.html
49. discount-amazon-cat-1205230-sort-pmrank.html
50. discount-amazon-cat-1205230-sort-salesrank+1.html
51. discount-amazon-cat-1205230-sort-salesrank.html
52. discount-amazon-cat-1205230-sort-titlerank+1.html
53. discount-amazon-cat-1205230-sort-titlerank.html
54. discount-amazon-cat-1205230.html II. Deep Tokenization Using Site-Specific Delimiters The term "deep tokenization" is used to refer to tokenizing based on a broad range of possible delimiters used in a given web site. Then, other information from a web site can be used to determine which of those tokens is important or otherwise consistent with the other tokens appearing in a given URL portion, as well as other URL portions. From such information, inferences also can be made as to the custom delimiters (site specific character delimiters and unit changes) being used.

A first step in a machine-implemented process (i.e., generally not using human input) for includes determining (step 520) all possible tokens that can be created based on possible site-specific delimiters in use. Site-specific delimiters include special characters other than alphanumeric characters, and any of the standard delimiters in a particular implementation. In the case of a URL, examples of standard delimiters include {'/', '?', '&', '.'}. In some cases, a delimiter is only a standard delimiter in a particular context; for example, '.' is a standard delimiter only in the host name component of a URL. By contrast, '_' is not a standard delimiter. Thus, in the example '256_MB', '_' can be a site-specific delimiter, which, if used for tokenization would generate tokens '256' and 'MB'.

Other site-specific delimiters include unit changes, which include changes between alphabetical characters and numerals, and case changes. However, it is preferred herein that change from upper case to lower case is not considered as a possible delimiter in "camel case" situations (e.g. 'QQcitySydney', where the change from 'S' to 'y', although a change in case, would not be considered a delimiter between tokens). If such a situation were considered as a possible delimiter, then unlikely results such as splitting 'Sydney' into multiple tokens may occur. Instead, deep tokenization would parse this example into 3 units: 'QQ', 'city' and 'Sydney'. By further example, '256 MB', '256' and 'MB' are two units generated by a change from numerals to alphabetic characters.

The following can be done for each level that was identified using standard delimiters, for which further interpretation or tokenization is desired. In some cases, the following can be done for all such levels. Also, as portions of a given level are parsed, then these steps can be performed again within remaining portions of that original level (i.e., as new levels are formed from a token at an original level, the portions of the original level can be further subdivided). A more concrete example may be helpful, assume that "discount-amazon-cat-11046471" was a portion of a URL obtained after usage of standard delimiters, and could therefore be termed a level. Then, after further tokenization using a site specific delimiter, "-", further deep tokens "discount" "amazon" cat and "11046471" are identified. Then, further levels "discount=amazon" and "cat=11046471" can be identified (discount and cat being keys with corresponding values amazon and 11046471).

Since an output from this step is expected to be an over-inclusive set of deep tokens, not all such deep tokens may represent an appropriate subdivision of the characters contained in the level/token being subdivided. Therefore, further steps provide for determining which tokens of all the possible tokens "make sense" within a given URL portion, and also when considering a number of the URLs. Also, some tokens may be legitimate tokens, but not generally of interest for characterizing content of a website, or may be misleading for determining whether a given website obtained with one address has the same as a website obtained with a different address (e.g., session-id tokens, although tokens, do not provide information about web site content, so it would be desirable to be able to separate those from script parameters and values.)

III. Identifying Anchors for Patterns of Deep Tokens

As discussed above, since deep tokenization yields a large number of possible deep tokens (i.e., discrete units of information) that may not actually be useful discretizations, it is desired to identify which deep tokens can be used to provide structure to the parsed URL levels. For sake of convenience, deep tokens that can be used (or are used) as a basis for pattern formation, allowing further structuring of a given token, are called anchors.

A goal is to identify a sequence (pattern) of anchors, separated by "wild cards", which each comprise one or more deep tokens (i.e., "wild cards") signify areas of a given token that may, at least in some cases, be recursively characterized, or subsequently further tokenized). Aspects of such pattern identification are introduced with respect to FIG. 5 and described in more detail with respect to FIGS. 6 and 7.

The following provides an example of how anchors useful in this type of pattern formation process (i.e., a process of providing a pattern of tokens and wildcards that describe a larger token) can be identified. In the particular context of a level of a URL, and a set of deep tokens at that level, the following is an example strategy for selecting anchors from among deep tokens at a level.

Common deep tokens are identified (steps 525), e.g., at first, deep tokens spanning at least a first threshold (e.g., 90%) or more tokens are used. For example, in the context of Table 1, deep tokens spanning about 90% of the URLs listed include "discount" and "amazon".

Such deep tokens can be grouped (step 560) according to the following three parameters. One parameter is a position with respect to a larger token in which that deep token appears (615, 625). In particular, a current token can be a wildcard comprising one or more deep tokens, where that wildcard is a portion of a pattern formed on the basis of previously selected anchors.

For example, a URL level may contain, "discount-amazon-cat", and so, discount, amazon, and cat all would deep tokens of this larger token. However, because "discount" is at the beginning, while both "amazon" and "cat" are not, these latter deep tokens would not be grouped with "amazon."

Another parameter is what delimiters separate the deep tokens (640, 635), which can otherwise be referred to as transitions between deep tokens. For "discount-amazon-cat-11046471", the delimiters separating "amazon" and "cat" are the same, and so they may be grouped.

Another parameter is the contents of the deep token, whether it contains only numerals, alphabetical characters or a mixture (620, 630). Uniform deep tokens (i.e., all numbers, all letters, all uppercase, all lowercase, etc) are better candidates for grouping (recall that deep tokenizing often can result in splitting based on case changes, however, such deep tokens may ultimately turn out not to be important.)

A principal difference between higher than a threshold frequency deep tokens and deep tokens appearing with less than the threshold frequency is that the lower frequency tokens are grouped with further consideration to their respective distances from a previously identified anchor deep token on the left (610) (i.e., towards the beginning of the URL portion being split).

Note that thus deep tokens of greater than a threshold are first considered and grouped among themselves, and then those with a frequency less than the threshold are considered and grouped amongst themselves.

Based on established groups of deep tokens, then each deep token group is evaluated (step 535), as described further with respect to FIG. 7. One evaluation criterion is a number of deep tokens in the group (755). Another evaluation criterion is coverage (750), defined as a total number of tokens that the deep tokens in a given group span. A group with more coverage is given preference. Such a situation may arise, for example, where two deep tokens cover (i.e., appear in) disjoint subsets of larger tokens in a set, then a total coverage the group may be substantially higher than if both tokens always appeared together. Variance of support of all deep tokens (760) within a group is a further evaluation consideration. Also, distance from a left anchor (also a feature used for grouping) can be a measure useful in evaluating token groups (765). These different considerations can be normalized (770) in relation to each other to allow a group having a higher ranking to have higher priority of selection in usage for pattern formation in the token being considered (i.e., a highest ranked set of anchors will be the first deep token(s) used in a pattern to subdivide a given token).

For the tokens of Table 1, deep tokens 'discount', 'amazon', 'cat' and 'html' are present in more than 90% of these tokens, and they are grouped into three different groups, based on their transitions: ('discount'), ('amazon', 'cat') and ('html'). As described below, these token groups are respectively used/selected (775) as anchors in the first three levels of pattern formation, below.

So, at first, it is expected that there may be multiple candidate groups of 90% tokens, of which a group can be selected, and used in parsing (540) the patterns (described further below). It is expected that in the more general case, one iteration of parsing (540) with a given group of deep tokens will occur and then a decision will be made as to whether more parsing is desired (550), and if so returning to do another round of deep token selection and grouping, which can include selection and grouping of more common tokens, or as the URL tokens become progressively more refined, then other ways to identify less common deep tokens (530) are employed (described immediately below).

Further Anchor Identification During Recursion

Once there are no further deep tokens spanning 90% or more of a given token set, then tokens spanning fewer than 90% of a given token set can be considered (530).

Often, this situation occurs after having parsed a token comprising an entire level of a URL into smaller portions (e.g., each entry of Table 1), and these portions then no longer have 90%+deep tokens, which indicates that the process is working to identify distinguishing aspects of the token at that URL level. For example, excluding "amazon", "discount" "html" and "cat", other frequently appearing values are numbers following "cat", such as 11046471 and 1205230, which can then be used as anchors for the level then being parsed.

Such –90% tokens can be grouped generally like 90%+ tokens, except that a further consideration is a distance from an anchor on the left. An overarching consideration is that if there is no anchor already defined or identified on the left for that token, then the first deep token of that token is considered to be an anchor. For example, if considering that the URL portions of Table 1 had been parsed up to the point of " . . . cat-", then those URL portions would end with wildcard portions starting with numbers such as "11046471" and "1205230", and so these numbers would be the first deep token appearing in those wildcards, and would likely be considered good candidates for anchoring a pattern at that level (i.e., for tokenization within the wildcard portion starting after cat-).

This aspect will be revisited after describing splitting of tokens based on anchors, and other related aspects.

IV. Split Tokens Based on Patterns:

As can be discerned, an output from the previous step is one or more groups (generally, one group) of deep tokens (each of one or more deep tokens) that are to be used in developing a pattern for a given token (step 540). This pattern will comprise deep tokens from the group separated by a wildcard defined as one or more other deep tokens. A textual example may more easily illustrate the concept of a deep token group, and use of wildcards. For example, if the group of deep tokens included {took, from, a, the, left}, and an entire token was "Larry took a red apple from the basket before he left for school", then a pattern generated based on the deep token group and the entire token would be "+took a+from the+ left+" where each wildcard portion (alternatively, a subtoken of the entire token) respectively would comprise deep tokens "Larry", "red apple" (where "red" and "apple" each are deep tokens), "basket before he", and "for school". The usage of such pattern generation includes that a number of other sentences may have different values for the wildcards that would also otherwise fit into the pattern. For example, "Lucy took a juicy pear from her tree before she left for work" also would fit into that pattern, except the wildcards would be composed of different deep tokens: "Lucy", "juicy pear" "her tree before she", and "for work."

Thus, a common structure among these sentences can be identified and used in extracting meaning from each sentence. As also can be discerned, each wildcard may have any number of deep tokens, and thus each wildcard may thus be subject to further pattern detection activities. What deep tokens are selected as being important, and which are grouped can be different than what this example suggests. For example, a rule in choosing deep tokens as a basis for forming such patterns can be that a token should not begin with a wildcard, as in the "Larry . . . " example above. Scaling up to an environment having thousands of tokens, it would be apparent that many different types of wildcards may appear within different patterns, and each of these wildcards may have some degree of similarity or may have some content in common. The recursive nature of the tokenization/patternization here thus helps to extract increasingly more specific pieces of information from custom delimited URL portions.

As described above, the deep tokens selected as a basis for forming such patterns are called "anchors" in that they anchor such patterns. As with the concept of "tokens", and "deep tokens", the concept of a pattern anchor is relative. In other words, a token can be a string determined through any sort of delimiting process, and deep token can be a portion of that string, and an anchor can be selected from any deep token.

A more particular example involving the URL portions of Table 1 proceeds as follows with respect to Table 2. At a first level (here, level 0), the beginning is with root pattern '+', meaning that the entire URL portion remains to be matched. Then, the highest priority group of anchors, which was "discount" is used (steps 540), resulting in Level 1. Then, the next highest priority group of anchors is used (steps 525 group of 90% determined anchors (".html") is used to produce level 4 (anchors determined through steps 525, 560, etc.).

In each of the foregoing levels, the wildcard symbol, "+" represents the remainder of a URL portion needing to be tokenized further. Now, after level 4, the most common deep tokens have been used to produce the pattern evidenced in Table 2, and the remainder of the URL portions from Table 1 evidence more variation from this point forward. Thus, at each level, there is more variation in deep tokens in each group. Step 530 relates to identifying and grouping the next set of more common (i.e., more common than deep tokens remaining in the wildcard patterns). Then, the process of FIG. 5 can continue with evaluation 535 of such groups to select at least one group for use in parsing 540. The identification of a decision based on common deep tokens (525) reflects that there is a preference first for using the most commonly appearing tokens for as many parsing iterations as possible, and then using less common tokens thereafter. In some examples, a frequency of appearance of tokens can operate more as metric, rather than as a decision point (i.e., a boundary between what is more or less common can be more fuzzy).

Level 5 would be formed from a deep token group comprising the numbers following "cat" in Table 1, e.g., 11046471, 1205230, etc. A next further level 6 is then formed from a group of deep tokens comprising "sku" and "sort". Note that level 6 is hierarchically within level 5, such that the URL portions having containing number 11046471 versus 1205230 are first split by that number, and then within that split are the further splits based on "sku" and "sort".

Note that this example shows that a selection process for deep tokens, at least at these deeper levels, to use next can include different combinations of the factors mentioned, in that a total number of URL portions from Table 1 containing "sku" or "sort" is higher than containing either 11045471 or 1205230, since "sku" and "sort" appears in URL portions of both numbers. However, both "sku" and "sort" are farther from a beginning of a wildcard at that level, i.e., they are farther from the end of " . . . cat-" than the numbers, and so the numbers may be more likely to be useful anchors.

Another example is that "-B-" is a deep token by itself (transition between character B and number 0) is used before "-item-" even though both appears in the wildcard portion following "-sku". This is because B is closer to the beginning of the wildcard than "item". However, ultimately, the numbers and letters combination following the B's, e.g., "B0006BB5V" of item 1 in Table 1, may end up being considered one deep token for the purposes of key/value tagging (discussed below), even though the pattern formed may be reflect that without further analysis.

Another example is that the deep token "-item-" is used before the numbers preceding it, even though the numbers are closer to the beginning of the wildcard preceding that level, which follows " . . . -B" since "-item-" appears frequently within the remaining wildcard portion at that point, i.e., where the wildcard portion begins after 'sku-' and continues to ".html", '-item' figures prominently in that wildcard.

Such hierarchical splitting of the URL portions of Table 1 can continue. For example, a number of the URL portions contain the string, "original_dell_latitude_inspiron_" while some continue with "cd_cdrw_dvd" and others continue with "8x_dvd_drive_" for example. Each of these may end up being a further branch in Table 2, below, except that their key will be repeated, as each of these deep tokens, e.g., 8x, dvd, drive, etc., would ultimately be determined to be values for the single key "item" during tagging, below. Also, as such splitting (i.e., recursive tokenization) occurs, a given pattern at a level may contain multiple wildcard portions (subtokens with respect to a parent node). For example, "discount-amazon-cat-11046471-sku-B+-item-+.html" contains multiple wildcard portions.

The steps of FIG. 5 show an iterative pattern where a group of deep tokens is identified and used to parse remaining wildcard portions of URL patterns (i.e., at first a pattern can include an entire URL portion, and then as more and more iterations occur, the remaining unparsed areas of that URL portion will become smaller). In some cases, it may be beneficial to identify and use for this parsing more than one deep token group at a time. For example, in the usage of the most common deep tokens, it may be useful to initially form groups of all such most common deep tokens, and use them, as it is quite likely that these deep tokens will be actual tokens in use in the system. However, for less common deep tokens, it may be desirable to conduct a separate iteration of deep token grouping after each parsing step.

TABLE 2

| Branch | Pattern |
|---|---|
| 0 | Start (wildcard) |
| 1 | discount-+ |
| 2 | discount-amazon-can+ |
| 3 | discount-amazon-cat-+.html |
| 4 | discount-amazon-cat-11046471-+.html |
| 5 | discount-amazon-cat-11046471-sku-+.html |
| 6 | discount-amazon-cat-11046471-sku-B+.html |
| 7 | discount-amazon-cat-11046471-sku-B+-item-+.html |
| 5 | discount-amazon-cat-11046471-sort-+.html |
| 4 | discount-amazon-cat-1205230-+.html |
| 5 | discount-amazon-cat-1205230-sku-+.html |
| 6 | discount-amazon-cat-1205230-sku-B+.html |
| 7 | discount-amazon-cat-1205230-sku-B+-item-+.html |
| 5 | discount-amazon-cat-1205230-sort-+.html |

V. Interpreting Tokens—Keys or Values

As tokenization occurs, and/or as it completes, per the above, interpretation (step 565) of such tokens can occur. Such interpretation is described in relation to FIG. 8, which shows an organization of information including inputs to a dynamic programming algorithm, exemplified by Viterbi 830.

A first step in such interpretation can include initially tagging (805) each deep token within a URL portion (e.g., within each of the numbered entries of Table 1, a number of deep tokens were identified) as a key or a value, when there is a reasonably high confidence in such initial tagging. For example, of all the numbered entries of FIG. 1, a deep token that occurs in more than 90% of all entries is likely to be a key, and such entries initially are tagged as such.

Global Tagging:

A dynamic programming step, such as using the Viterbi algorithm, is used to generate a probability (835) of each deep token being a key or a value. The Viterbi algorithm requires an observed sequence of events, which can include the initially assigned (805) key/value information from local tagging. Then, a probability of a given deep token being a key or a value is considered to be a hidden state, and as such the Viterbi path for a given portion of a URL (e.g., one of the numbered entries in Table 1) would be the most likely sequence of hidden states that explains (results in) the sequence of events.

Other information that can be used as observed information includes information from the patterns generated and now organized in the tree (or another suitable structure), as exemplified in Table 2. For example, each pattern can be considered a node of the tree, and as shown may contain one or more deep tokens. Information concerning a number of child nodes of a given node (810), as well as a number of sibling nodes (815) of a given node can be used as observed events for the deep tokens within that node. For example, two patterns that would be considered sibling nodes are "discount-amazon-cat-11046471-+" and "discount-amazon-cat-1205230-+". Child nodes of "discount-+" include "discount-amazon-+" and "discount-amazon-cat-+".

Also within a given node, positions of deep tokens selected as anchors (820), as well as what tags were assigned to previous and successive deep tokens in that node can be observed events (825). For example, it would be more likely that a value follows a key, but in some cases, it may be just as likely that another value follows a value than for a key to follow.

Rewriting Tokens in Normalized Form & Outputting Results

From determined key/value assignments for the deep tokens, the URL portions can be rewritten (if desired) according to standard delimiter guidelines. For example, in the case of RFC 1738 standard delimiters, URL portion number 29 from Table 1 can be rewritten as "discount=amazon&cat=11046471&sort=titlerank." Similarly, URL portion numbers 16 and 17 from Table 1 can be rewritten as follows, where the characters following B0080 were too variable to be useful in interpreting the content of the items identified by the URL portions, and hence could be excluded from a token representing that grouping of URLs: "discount=amazon&cat=11046471&sku=B00080&item1=original&item2=dell&item3=1atitude&item4=inspiron&item5=dvd&item6=drive. In other words, this rewritten token can represent a number of URL portions that remain variable in what can follow B00080.

In any of the above situations, results accruing from these methods and systems performing such methods includes capability to output and save URLs in a standardized format, enabling further processing of such URLs, and analysis of content of pages identified by those URLs. Further outputs allow for determining whether or not such a page should be retrieved. In turn, these outputs can be used in higher-order systems providing capabilities such as searching, determining ad placement strategies, and the like.

The above examples and aspects presented in them show how a data-mining oriented approach to extracting information from non-standard URLs or portions of them can be implemented. Many of these examples include a number of aspects that include heuristics for evaluating how to proceed or to categorize a given type of information. Different implementations may use different of these heuristics or use variations of them in reaching a similar result and would be considered alternatives within the scope of what a person of ordinary skill would have understood from these disclosures. Examples have been presented in the context of text strings used as resource locators, and more particularly, such text strings have contained tokens delimited in a format not known in advance, and used to identify parameters and values for such parameters. So, aspects used in such examples can be generalized to similar situations, aside from the resource locator examples. In some cases, subject matter has been presented in a linear or sequential fashion, but such presentation does not necessitate that steps in such subject matter are required to be performed sequentially or in a particular order.

We claim:

1. A method for processing Uniform Resource Locators (URLs), comprising the steps of:
   (a) obtaining a plurality of related URLs;
   (b) parsing the plurality of related URLs to obtain one or more tokens from each URL, each token that is obtained by parsing the plurality of related URLs being included in a set of current tokens;

(c) identifying a set of deep tokens, wherein each deep token, of the set of deep tokens, is a portion of at least one token of the set of current tokens;
(d) determining a set of anchors for tokens that are currently included in the set of current tokens, wherein each anchor is a deep token from the set of deep tokens;
(e) forming a set of patterns for the set of current tokens based on the set of anchors, wherein each pattern of the set of patterns comprises (e1) an anchor from the set of anchors, and (e2) one or more subtokens, wherein each subtoken of the one or more subtokens comprises one or more deep tokens from the set of deep tokens;
(f) organizing the set of patterns in a tree of nodes, wherein within the tree each pattern in the set of patterns is a sibling node to at least one other pattern in the set of patterns;
(g) selecting a subtoken from a pattern, of the set of patterns, to represent a new set of current tokens, and within the tree, creating for the subtoken a child node of the node corresponding to that pattern;
(h) for one or more iterations, repeating steps (d)-(g) by using each new set of current tokens as the set of current tokens; and
(i) tagging deep tokens in the set of deep tokens as either keys or values based on organization information from the tree and on initial tag assignments;
(j) wherein the steps of the method are performed by one or more computing devices.

2. The method of claim 1, wherein step (i) comprises using a dynamic programming algorithm to receive the organization information from the tree and the initial tag assignments as observed events, and to output probabilities that the deep tokens in the set of deep tokens are either keys or values.

3. The method of claim 1, wherein step (d) comprises using heuristic rules to group the set of deep tokens appearing in the set of current tokens.

4. The method of claim 3, wherein using the heuristic rules comprises considering a type of deep token.

5. The method of claim 4, wherein the type of deep token is determined based on containing only numerals, only alphabetical characters, or a mixture of both numerals and alphabetical characters.

6. The method of claim 3, wherein using the heuristic rules comprises considering a frequency with which a deep token, of the set of deep tokens, appears within the set of current tokens.

7. The method of claim 6, wherein a cutoff frequency for grouping deep tokens as potential anchors is 90% of the set of current tokens.

8. The method of claim 3, wherein using the heuristic rules comprises considering respective positions of one or more deep tokens within a token of the set of current tokens.

9. The method of claim 3, wherein using the heuristic rules comprises considering a position, within a token of the set of current tokens, of a deep token selected as an anchor.

10. The method of claim 3, wherein groups of deep tokens are evaluated for priority of anchor selection based on anchor selection heuristics.

11. The method of claim 10, wherein the anchor selection heuristics include one or more of a number of deep tokens within each group, variance of support for deep tokens in each group, and a total number of deep tokens collectively covered by the deep tokens of each group.

12. The method of claim 10, wherein fewer deep tokens in a given group is a factor for rating such groups more highly.

13. The method of claim 1, further comprising using the tagged deep tokens as inputs to one or more of a web crawling process, an advertisement selection process, and a process for inferring content of pages referenced by the plurality of related URLs.

14. A method of analyzing Uniform Resource Locators (URLs), comprising the steps of:
(a) obtaining a plurality of tokens derived from a plurality of URLs;
(b) identifying a set of deep tokens that covers ways in which each deep token, of the set of deep tokens, encodes any separately identifiable key or value, wherein each deep token, of the set of deep tokens, is a part of at least one token of the plurality of tokens;
(c) selecting a group of anchors, each anchor being a deep token from the set of deep tokens and selected at least based on a frequency of appearance among the plurality of tokens;
(d) forming a set of patterns based on the anchors of the group of anchors, wherein each pattern in the set of patterns comprises (i) one or more anchors from the group of anchors, and (ii) a portion that comprises one or more deep tokens of the set of deep tokens;
(e) providing each pattern of the set of patterns as a node in a tree;
(f) for one or more iterations, repeating steps (c)-(e) for the portion of each pattern, in the set of patterns, by setting the set of deep tokens to comprise the one or more deep tokens for said portion, and within the tree providing one or more resulting patterns as child nodes of said each pattern and sibling nodes with respect to each other, thereby adding to the tree branches with increasingly specific patterns of anchors and increasingly smaller sets of deep tokens in the portions of the specific patterns; and
(g) identifying deep tokens of the set of deep tokens as keys or values by initially identifying frequently appearing deep tokens as keys, and then using information from the tree and the initial identifications as an observed sequence of events for a Viterbi algorithm that outputs, as a hidden state, a probability that a given deep token of the set of deep tokens is a key or a value;
(h) wherein the steps of the method are performed by one or more computing devices.

15. A non-transitory computer readable medium storing instructions for analyzing Uniform Resource Locators (URLs), wherein the instructions when executed cause performance of steps comprising:
(a) obtaining a plurality of tokens derived from a plurality of URLs;
(b) identifying a set of deep tokens that covers ways in which each deep token, of the set of deep tokens, encodes any separately identifiable key or value, wherein each deep token, of the set of deep tokens, is a part of at least one token of the plurality of tokens;
(c) selecting a group of anchors, each anchor being a deep token from the set of deep tokens and selected at least based on a frequency of appearance among the plurality of tokens;
(d) forming a set of patterns based on the anchors of the group of anchors, wherein each pattern in the set of patterns comprises (i) one or more anchors from the group of anchors, and (ii) a portion that comprises one or more deep tokens of the set of deep tokens;
(e) providing each pattern of the set of patterns as a node in a tree;
(f) for one or more iterations, repeating steps (c)-(e) for the portion of each pattern, in the set of patterns, by setting the set of deep tokens to comprise the one or more deep tokens for said portion, and within the tree providing one or more resulting patterns as child nodes of said each pattern and sibling nodes with respect to each other, thereby adding to the tree branches with increasingly specific patterns of anchors and increasingly smaller sets of deep tokens in the portions of the specific patterns; and (g) identifying deep tokens of the set of deep tokens as keys or values by initially identifying frequently appearing deep tokens as keys, and then using information from the tree and the initial identifications as an observed sequence of events for a Viterbi algorithm that outputs, as a hidden state, a probability that a given deep token of the set of deep tokens is a key or a value.

16. The non-transitory computer readable medium of claim 15, wherein the instructions that cause performance of step (c) comprise instructions which, when executed, cause using heuristic rules to group the set of deep tokens appearing in the plurality of tokens.

17. The non-transitory computer readable medium of claim 16, wherein the instructions that cause using the heuristic rules comprise instructions which, when executed, cause differentiating between deep tokens containing only numerals, only alphabetical characters, or a mixture of both numerals and alphabetical characters.

18. The non-transitory computer readable medium of claim 16, wherein the instructions that cause using the heuristic rules comprise instructions which, when executed, cause considering a frequency with which a given deep token appears within the plurality of tokens.

19. The non-transitory computer readable medium of claim 16, wherein the instructions that cause using the heuristic rules comprise instructions which, when executed, cause considering respective positions of one or more deep tokens within a token of the plurality of tokens.

20. The non-transitory computer readable medium of claim 15, further comprising instructions which, when executed, cause using the identified deep tokens as inputs to one or more of a web crawling process, an advertisement selection process, and a process for inferring content of pages referenced by the plurality of URLs.

21. A method for processing Uniform Resource Locators (URLs), comprising:

obtaining a plurality of tokens from a plurality of related URLs;

obtaining a set of subtokens from the plurality of tokens, wherein each subtoken, in the set of subtokens, is either a key, or a value, that is encoded in a custom delimiter scheme;

modeling a set of probabilities with a Viterbi algorithm, wherein for each subtoken, of the set of subtokens, the set of probabilities includes a probability that said each subtoken is either a key or a value; and rewriting the plurality of tokens using standard delimiters for keys and values based on the set of probabilities;

wherein the steps of the method are performed by one or more computing devices.

22. The method of claim 21, wherein information comprising frequencies of appearance of the set of subtokens within the plurality of tokens and relative arrangements of the set of subtokens within the plurality of tokens are used as observed events, and the set of probabilities obtained from the Viterbi algorithm are treated as hidden states.

23. The method of claim 22, wherein the relative arrangements of the set of subtokens are represented by a tree of nodes, wherein the parent nodes in the tree of nodes represent general patterns of anchor subtokens separated by one or more other subtokens of the set of subtokens, and child nodes of these the parent nodes represent increasingly specific patterns of anchor subtokens.

24. The method of claim 23, wherein the tree of nodes is created by recursively selecting anchor subtokens at a given node of the tree to define a pattern of a child node of the tree.

25. The method of claim 23, wherein anchor subtokens are selected based on heuristics including a relative location within the one or more subtokens at a given node and a frequency with which an anchor subtoken appears among one or more sibling nodes of the tree.

26. The method of claim 21, further comprising using the rewritten plurality of tokens as inputs in determining whether or not to retrieve one or more of the pages referenced by the plurality of related URLs.

27. The method of claim 26, wherein the retrieval occurs for indexing content of a retrieved page in a crawling process.

28. The method of claim 26, wherein the determining operates to avoid retrieval of web pages having duplicative content referenced by multiple different URLs.

29. The method of claim 21, further comprising using the rewritten plurality of tokens to infer content of one or more of pages that are referenced by the plurality of related URLs.

30. The method of claim 21, further comprising using the rewritten plurality of tokens in an advertisement selection algorithm.

* * * * *